2 Sheets—Sheet 1.

F. LEONARD.

Assignor to the CLEVELAND CITY FORGE AND IRON CO.

CHAIN-MACHINE.

No. 7,492. Reissued Feb. 6, 1877.

Witnesses.
Geo. B. Burton
J. H. Burridge

Inventor:
F. Leonard
Per Burridge & Co.
Attys.

2 Sheets—Sheet 2.

F. LEONARD.

Assignor to the CLEVELAND CITY FORGE AND IRON CO.

CHAIN-MACHINE.

No. 7,492. Reissued Feb. 6, 1877.

Witnesses.
Geo. R. Burton
J. H. Burridge.

Inventor.
F. Leonard
Per Burridge & Co.
Attys.

UNITED STATES PATENT OFFICE

FRANKLIN LEONARD, OF CLEVELAND, OHIO, ASSIGNOR TO THE CLEVELAND CITY FORGE AND IRON COMPANY, OF SAME PLACE.

IMPROVEMENT IN CHAIN-MACHINES.

Specification forming part of Letters Patent No. 145,063, dated December 2, 1873; reissue No. 7,492, dated February 6, 1877; application filed November 27, 1876.

*To all whom it may concern:*

Be it known that I, FRANKLIN LEONARD, of Cleveland, in the county of Cuyahoga and State of Ohio, have invented certain new and useful Improvements in Link-Machines; and I do hereby declare that the following is a full, clear, and complete description thereof, reference being had to the accompanying drawings, making part of the same.

The first part of this invention relates to certain devices for making chain-links, also links for railway-car couplings, &c.; and the object thereof is to facilitate the work of bending the metal into shape for links.

The second part of the invention relates to a trip-hammer arranged in connection with the bending devices, and which co-operates with the same for welding the ends of the links together by means of dies in the face of the hammer, conforming to the configuration of the link, the invention being an improvement of a similar machine for which a patent was granted to me July 8, 1873.

The construction, arrangement, and operation of the machine are hereinafter more fully described, reference being had to the accompanying drawings, making part of this specification, in which—

Figure 1:
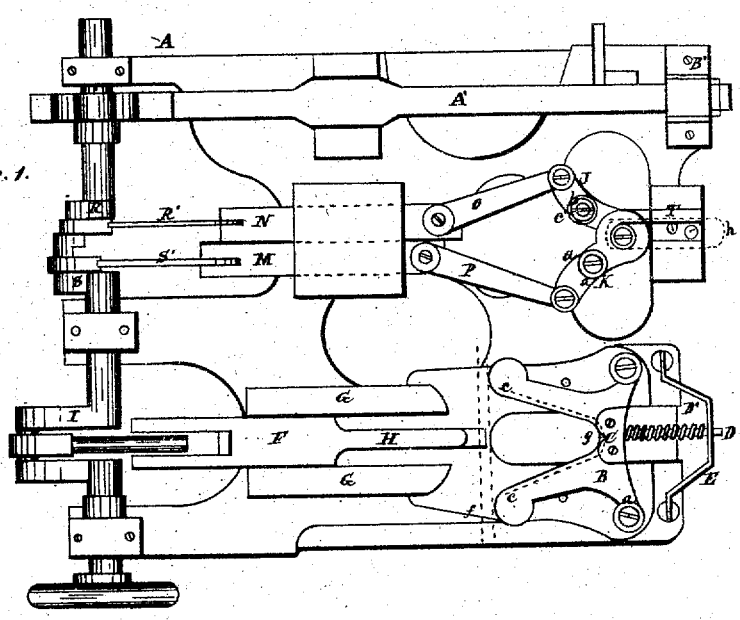
Figure 2:
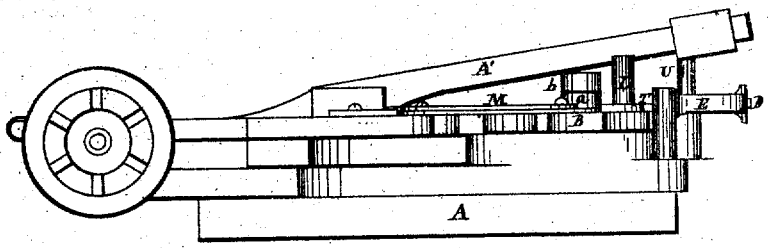
Figure 3:
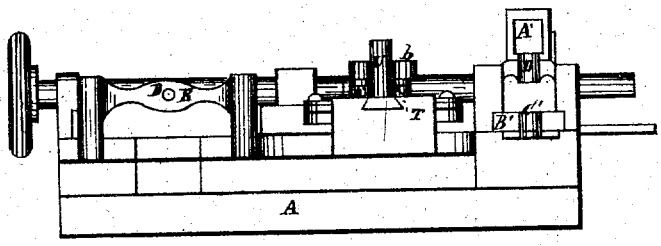
Figure 4:
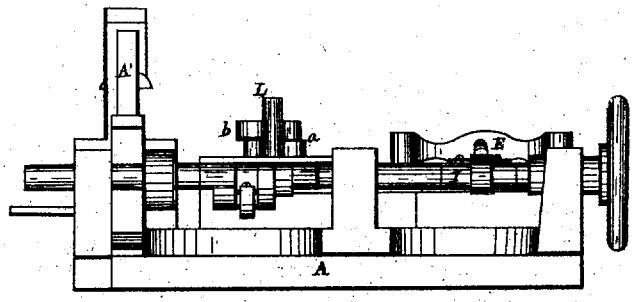

Figure 1 is a plan view of the machine. Fig. 2 is a side elevation; Fig. 3, a front elevation; Fig. 4, a back elevation. Figs. 5, 6, 7, and 8 are detached sections.

Like letters of reference refer to like parts in the several views.

A represents the bed-plate of the machine, on the front end of which is pivoted, at the points *a*, a pair of arms or compressors, B, Fig. 1, the lower edges of which are rabbeted out, as indicated by the dotted lines *c*, thereby forming a narrow projection or flange, *e*, along the inner upper edge of each arm. The position that the two arms hold in relation to each other, as shown in the drawings, is maintained by the link C, whereby the two arms are pivoted to each other.

From the link projects forward a stem, D, around which is coiled a spring, D′. Said stem is held in position and guided by the stay E, through which it slides. The purpose of the link, stem, and spring will presently be shown.

F is a slide, secured in its relation to the arms referred to by ways G. The front end of said slide terminates in a bill, H, which is about the length and thickness of the inside of a link, and around which the link is formed, as will presently be shown. A reciprocating movement is imparted to the slide by the crank I, to which it is connected by a pitman. J K, Fig. 1, are also a pair of arms, one end of each of which is pivoted to a post, L, Fig. 2, whereas each opposite end, respectively, is attached to slides M N by links O P. Said slides are connected to the cranks R S by pitmen R′ S′, as shown in Fig. 1, whereby they are operated. To each of the arms J K is secured a roller, *a b*, Figs. 1 and 4. Between the roller *b* and standard L is a pillow-block, T, Fig. 1, the purpose of which will presently be shown.

V, Fig. 3, is an adjustable gage, hereinafter referred to.

A′, Fig. 2, is a trip-hammer, operated in the ordinary way. In the face of said hammer is a print, *c′*, Fig. 6, in shape corresponding to the rounded end of a link. In the face of the anvil or block B′, Fig. 5, is sunk a die or print, *d*, corresponding to the print *c′* in the face of the hammer to which it is related, as shown in Fig. 7.

Figure 5:
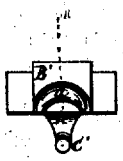
Figure 6:
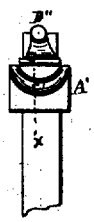
Figure 8:
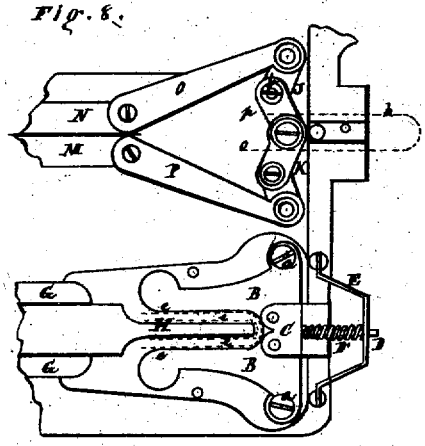
Figure 7:
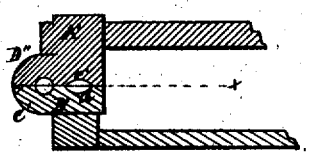

It will be observed that the prints or dies are wider in direction of the line *x x* than they are in a vertical direction, (or deep,) as will be seen in Fig. 7, and that the widest part of each die is between the two ends, as will be seen in Figs. 5 and 6.

Projecting or extending from the block B′ is a curved or rounded horn, C′; also, from the hammer projects a corresponding horn, D″, Figs. 5 and 6. The two horns or projectures are related to each other, as shown in Fig. 7, the use of which will hereinafter be shown.

The operation of the above-described machine is as follows: A bar or rod of the proper length of which to make a link is laid across in front of the arms B, as indicated by the dotted line *f*, Fig. 1. The bar, when in this position, is forced between the arms B by the bill H of the slide. The rounded ends of the arms, which, if necessary, may be provided with friction-rollers, allow the bar to bend and advance without dragging, thereby avoiding much frictional resistance upon the rod or bar. When the middle of the rod has reached the bottom of the arms at the point *g*, the continued advance of the bill causes the two arms to approach each other, thereby forcing the ends of the rod close against the sides of the bill, thus forming the sides of the link, as indicated by the dotted lines *h*, Fig. 8. During this bending of the rod it is prevented from springing upward by the flanges *e*, above described as projecting from the inner sides of the arms, under which the rod is held down while being bent. On the reverse action of the bill the two arms spread open by the action of the spring D′, which allows the partially-formed link to fall therefrom to the floor. The open ends of the link are now bent and lapped upon each other by the arms J K, Fig. 1, by inserting said ends between the standard L and the rollers *a b*, as indicated by the dotted lines *h*, Fig. 6. The two arms, on being drawn forward to the position shown in Fig. 1, force the two ends of the rod around the standard, causing one end to lap over on the other by means of the rollers, the tendency of which, on the movement of the arms, is around the standard.

It will be observed that the arm K moves in advance of the arm J, the result of which is to bend its end *o* of the link around first, which is immediately followed by the arm J, which carries its end *p* of the link around the standard and laps it fully onto the end *o*. The arm J is carried a little farther around the standard than is the arm K, by virtue of a little difference in the length of the cranks, and which rolls both ends of the link hard around the standard, thereby completing the lap for being welded.

The two heated ends of the link are welded together by inserting the lapped ends between the dies *c′ d*. The broad shallow form of the dies causes the weld to spread out in the direction of the line *x*, but is again upset and rounded by inserting the horn C′ in the line, or hanging the link thereon and moving it about for the stroke of the upper part D″ of the hammer, thereby rounding and shaping the weld to a proper size and shape. The shape of the horn preserves the shape of the link while being hammered, and the hollow parts *c′ d*, or dies thereof, retain the roundness or shape of the iron of which the link is made while being welded.

In my first and patented machine referred to, the arms B B were not connected to each other; they were separate, and moved independently. The consequence was, that on bending the iron, if one part should bend a little easier than another, (for being hotter or for other reasons,) the arms would not move equally at the same time; hence one side of the link would be longer than the other. Therefore, on bending, the ends for welding the lap would not be at the end, as one side or end would lap too far over onto the other, bringing the weld more or less on one side of the end, which was a matter of some inconvenience, to avoid which I have in this machine connected the two arms to each other by means of the link C, pivoted thereto as aforesaid. By this means the two arms must move alike and at the same time, even if the pressure is greater on one than upon the other; hence the bending of the rod or link must be equal and each side of the same length. The spring D′ around the guide-rod D opens the arms, as did the springs D in my former machine.

In my first machine the ends of the links were flattened or scarfed to form the lap. This was done by placing the ends in scarfing dies or prints formed in the face of the hammer, and in the face of the hammer-block. To do this the ends had to be heated expressly for that purpose, which required time and expense, to avoid which, in this machine, I weld by lapping the full ends of the link onto each other as though they were scarfed. To avoid having the two ends abut against each other while bending, I cause one side of the link to rest upon the pillow-block T, whereas the opposite side rests upon the bottom or plane of the bed, thereby throwing one side of the link above the other so far as to allow the ends to pass each other on being turned by the rollers or arms J K. To provide for the expansion of the excess of metal caused by the two full ends when welding them is the purpose of making the dies *c′ d* wider through the line *x* than they are deep. The surplus metal will spread out therein during the welding wider than the thickness of the iron, but which width is reduced to the proper size by the operation of the projectures C′ D″, thereby completing the link. In thus omitting the scarfing of the ends, the ends are bent, welded, and completed in one heat, whereas in the first machine two heats were required.

The purpose of the gage V is to prevent the link from being pushed in too far to form the lap of the ends, and which is readily adjusted to different length links.

I claim—

1. The link C and spring D′, in combination with the arms B B, in the manner substantially as described, and for the purpose specified.

2. The pillow-block T, arranged in relation to and in combination with the rollers *a b* and arms J K, in the manner as and for the purpose set forth.

3. The gage V, as arranged in relation to the standard L, rollers *a b*, and arms J K, for the purpose specified.

4. The dies or prints *c′ d* of the hammer and block, constructed as described, and cooperating in the manner substantially as set forth, for the purpose specified.

5. The block or rest T, arranged above the arms J K, or the bed, in combination with the standard L, substantially as and for the purpose set forth.

6. Welding dies or prints in the hammer and block, in combination with projectures or horns C′ D″, for the purpose specified.

7. The arms J K, arranged to co-operate conjointly with a differenced movement or sweep in relation to each other, in combination with the standard L, substantially as and for the purpose specified.

FRANKLIN LEONARD.

Witnesses:
W. H. BURRIDGE,
J. H. BURRIDGE.